No. 674,813. Patented May 21, 1901.
T. S. PEARSON.
CLOVER BUNCHER.
(Application filed Sept. 27, 1900.)
(No Model.)
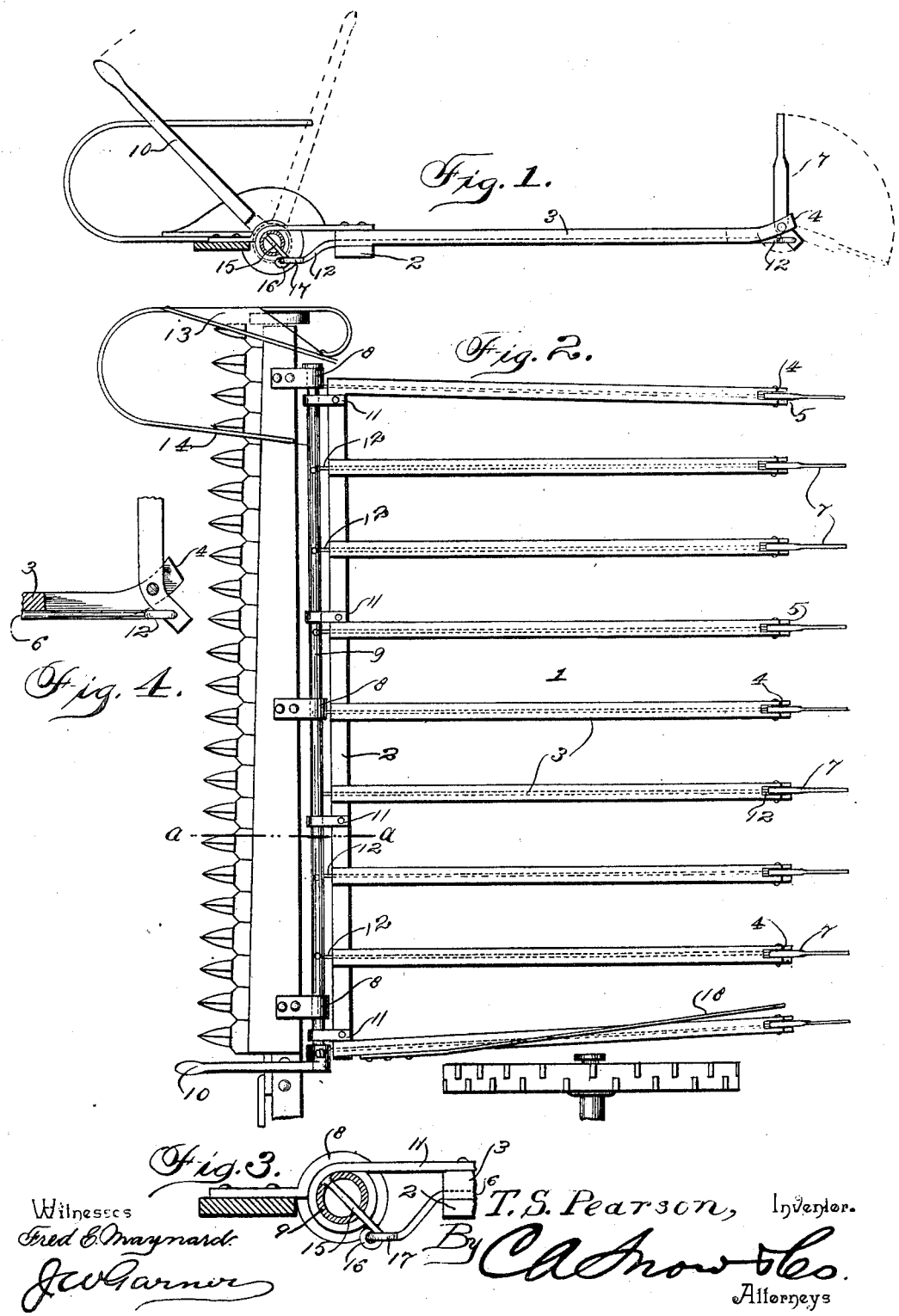
Witnesses
Fred E. Maynard
J. W. Garner
T. S. Pearson, Inventor.
By C. A. Snow & Co.
Attorneys

UNITED STATES PATENT OFFICE.

THOMAS S. PEARSON, OF CASSVILLE, INDIANA, ASSIGNOR OF TWO-FIFTHS TO DAVID J. TERRELL, OF KOKOMO, INDIANA.

CLOVER-BUNCHER.

SPECIFICATION forming part of Letters Patent No. 674,813, dated May 21, 1901.

Application filed September 27, 1900. Serial No. 31,323. (No model.)

*To all whom it may concern:*

Be it known that I, THOMAS S. PEARSON, a citizen of the United States, residing at Cassville, in the county of Howard and State of Indiana, have invented a new and useful Clover-Buncher, of which the following is a specification.

My invention is an improvement in bunching attachments for mowing-machines, the object of my invention being to provide a convenient and efficient attachment whereby hay or grass in being cut by a mowing-machine can be deposited in bunches over the field as it comes from the machine instead of being distributed thinly over the surface of the field, as is commonly done. To so bunch the grass is especially desirable in cutting clover where it is an object to save the seed, in which case, as is well known, the clover should be left in bunches and subject to the action of the weather for a time, during which period it should be disturbed as little as possible.

My invention consists in the peculiar construction and combination of devices hereinafter fully set forth, and pointed out in the claims.

In the accompanying drawings, Figure 1 is an elevation, partly in section, of a bunching attachment embodying my improvements, showing the same attached to a mowing-machine. Fig. 2 is a top plan view of the same. Fig. 3 is a detail sectional view taken on the line *a a* of Fig. 2. Fig. 4 is a detail sectional view of one of the slats, the holder pivoted thereto, and the connecting-rod attached to said holder.

In the embodiment of my invention I provide a platform 1, which is disposed in rear of the sickle-bar of the mowing-machine. The said platform comprises the head-bar 2 and the slats 3, which extend rearward therefrom and are preferably disposed on rearward-converging lines. Each of the slats has its rear end upturned, as at 4, and bifurcated to form the ears 5, and in the under side of each slat is a longitudinal groove 6. Between the ears 5 in the rear ends of the slats 3 are pivoted the holders 7, which may be upturned to a vertical position or turned rearward and caused to trail on the ground to clear the rear side of the platform and permit the clover to pass from the platform, as will be understood. I provide suitable bearings 8, which are secured on the sickle-bar and extend rearward therefrom, and in the said bearings is mounted a rock-shaft 9, which in practice is usually made of a section of gas-pipe of suitable length. To the inner end of the said rock-shaft is securd a hand-lever 10. The head-bar 2 of platform 1 is disposed on the rear side of the rock-shaft and connected thereto by suitable hinges, as at 11. In the form of my invention here shown the said hinges 11 are metallic straps, the rear ends of which are bolted on the bar 2 and the front ends of which are bent around the rock-shaft; but any suitable form of hinges may be employed, and I do not limit myself in this particular.

The lower ends of the holders 7 are connected to the rock-shaft by rods 12, which operate in the grooves 6 in the lower sides of slats 3. A divider 13 is at the outer end of the sickle-bar and has an inwardly-extending rearwardly-curved arm 14, that serves to direct the clover as it is cut onto the platform 1 and prevents it from moving laterally off the outer side of the platform. It will be understood that in the operation of my bunching attachment the holders 7 will be turned to the vertical position shown in Fig. 1 by the lever 10, rock-shaft 9, and rods 12, and that when a sufficient quantity of the clover has been collected on the platform the lever 10 will be turned rearward, thereby lowering the holders 7, so that their upper ends trail on the ground, when the clover by frictional contact with the ground will slide from the platform and be left in a bunch on the field.

Any suitable means may be employed for connecting the rods 12 to the lower ends of the holders 7 and to the rock-shaft 9. In the form of my invention herein shown I provide pins 15, which extend through the rock-shaft and have eyes 16 formed at their lower ends, which engage eyes 17, formed at the front ends of connecting-rods 12. A suitable fender-bar 18 is secured on the slat 3 which forms the inner side of the platform.

It will be observed by reference to Fig. 2 of the drawings that the slats 3 converge slightly rearwardly, and in practice this is the preferred manner in which said slats are disposed with relation to each other; but the said slats may be disposed at any suitable angle with relation to the head-bar and parallel with or at an angle to each other, if preferred, and I do not limit myself in this particular.

Having thus described my invention, I claim—

1. The combination with the sickle-bar of a mowing-machine, of a rock-shaft in bearings on said sickle-bar, a platform connected to the said rock-shaft and trailed in rear of the sickle-bar, said platform having rearward-extending slats, holders pivotally connected to the rear ends of said slats, rods connecting the lower ends of said holders to the said rock-shaft, and a lever to turn the said rock-shaft in its bearings, and thereby operate the said holders, substantially as described.

2. A bunching attachment for mowing-machines, comprising a rock-shaft having bearings adapted to be secured on the sickle-bar of a mower, a lever attached to said rock-shaft, a trailing platform connected to said rock-shaft and having rearward-extending slats, holders pivoted near their lower ends, to the rear ends of said slats and connecting-rods connecting the lower ends of said holders to the said rock-shaft, substantially as described.

In testimony that I claim the foregoing as my own I have hereto affixed my signature in the presence of two witnesses.

THOMAS S. PEARSON.

Witnesses:
ABRAM MIDDLETON,
G. W. JOHNSON.